United States Patent [19]
Ueda et al.

[11] Patent Number: 6,052,392
[45] Date of Patent: Apr. 18, 2000

[54] LASER APPARATUS HAVING AN OPTICAL GUIDE FORMED IN A CONGLOMERATE FORM WITH LONG AND CONTINUOUS OPTICAL FIBERS

[75] Inventors: Kenichi Ueda, 2195-5 Yaida, Inamachi, Tsukuba-gun, Ibaraki; Hiroshi Sekiguchi, Akishima, both of Japan

[73] Assignees: Kenichi Ueda, Ibaraki; Hoya Corporation, Tokyo, both of Japan

[21] Appl. No.: 08/959,584

[22] Filed: Oct. 29, 1997

[30]  Foreign Application Priority Data

Oct. 31, 1996 [JP] Japan ................................. 8-289821
Jun. 30, 1997 [JP] Japan ................................. 9-174450

[51] Int. Cl.⁷ ............................................. H01S 3/067
[52] U.S. Cl. ................... 372/6; 372/70; 372/94; 385/32
[58] Field of Search .................... 372/6, 70, 75, 372/92–94; 385/32

[56]  References Cited

U.S. PATENT DOCUMENTS

| | | | |
|---|---|---|---|
| 4,847,843 | 7/1989 | Byron et al. | 372/6 X |
| 5,050,173 | 9/1991 | Hughes | 372/6 |
| 5,245,690 | 9/1993 | Aida et al. | 372/6 X |
| 5,790,583 | 8/1998 | Ho | 372/92 |

OTHER PUBLICATIONS

Japenese Patent Publication No. HEI 4–51,027. (Date: Feb. 19, 1992).
Japenese Patent Publication No. HEI 3–3,283 (Date: Jan. 9, 1991).
Patent Abstracts of Japan, vol. 095, No. 010, Nov. 30, 1995 & JP 07 183597 A.
Liu et al: "Rectangular double–clad fibre laser with two–end–bundled pump" Electronics Letters, Aug. 29, 1996 IEE, UK vol. 32, No. 18, pp. 1673–1674. XP000637825 ISSN 0013–5194 abstract figure 1.
Patent Abstracts of Japan vol. 097, No. 006, Jun. 30, 1997 & JP 09 055556 A (OKI Electric Ind Co. Ltd.) Feb. 25, 1997.
Patent Abtracts of Japan vol. 097, No. 005, May 30, 1997 & JP 09 026379 A (Fijitsu Ltd.; Nippon Telegr & Amp. Jan. 28, 1997 abstract.
UEDA K. t al. "Future of high–power fiber lasers" Second Intern. Conference on Modern Problems of Laser Physics Russia, Jul. 28—Aug. 2, 1997. vol. 8 No. 3, pp. 774–781 XP002092367 ISSN 1054–660X, Laser Physics, May–June 1998 MAIK Nauka/Interperiodica Publishing Russia pp. 779–780 fig, 12–14.
Patent Abstracts of Japan vol., 018 No. 092 (P–1693), Feb. 15, 1994 & JP 05 297228.
UEDA K: "Optical cavity and future style of high–power fiber lasers" SPIE vol. 3267 Laser Resonators, San Jose, CA Jan. 26–27 1998, vol. 3267, pp. 14–22, XP002092368 ISSN 0277–786X, Proceedings of the SPIE–The International Society for Optical Engineering, 1998 Soc. Opt. Eng. USA sections 8, 9 fig. 12–14.

*Primary Examiner*—John D. Lee
*Attorney, Agent, or Firm*—Perman & Green, LLP

[57]  ABSTRACT

A laser apparatus capable of very effectively converting excitation light to laser oscillation light includes a single continuous long laser fiber wound by multiple turns and made immobile by an ultraviolet setting resin as to form a cylindrical shape conglomerate whose opposite ends are exposed as outputs for laser beam, and generates a laser oscillation light from the opposite ends upon radiation of excitation light from a periphery of the fiber. The laser fiber has a clad covering a core, which is doped with active lasing substances such as $Nd^{3+}$ ions.

12 Claims, 3 Drawing Sheets

LASER APPARATUS HAVING AN OPTICAL GUIDE FORMED IN A CONGLOMERATE FORM WITH LONG AND CONTINUOUS OPTICAL FIBERS

REFERENCE TO RELATED APPLICATION

This application claims the priority right under 35 U.S.C 119, of Japanese Patent Application No. Hei 08-289821 filed on Oct. 31, 1996, and No. Hei 09-174450 filed on Jun. 30, 1997, the entire disclosure of which is incorporated herein by reference.

BACKGROUND OF THE INVENTION

1. Field of the Invention

This invention relates to a laser apparatus for performing a laser oscillation upon supplying an excitation light to active lasing substances placed inside an optical fiber or an optical waveguide.

2. Description of Related Arts

While, in arts of optical telecommunication and optical fabrication technology, development of high-power, inexpensive laser apparatuses has been expected, optical fiber laser apparatuses and optical waveguide type laser apparatuses have previously been known as highly possible apparatuses to satisfy such expectations. Such optical fiber laser apparatuses and optical waveguide type laser apparatuses are capable of relatively easily rendering an oscillation transverse mode into a single mode by controlling a core diameter, a refractive index difference between a core and a clad, and the like. Confinement of light in a high density can more activate mutual actions between active lasing substances and light. When the length of the mutual actions is made longer, laser beam can be produced with a high efficiency and a dimensionally high quality. Thus, a high-quality, relatively inexpensive laser beam can be obtained.

To realize further higher power and efficiency of the laser beam, excitation light is necessarily guided with a high efficiency to a doped region (ordinarily, a core portion) of emission centers such as active lasing ions, dyes, or the like (hereinafter referred to as "active lasing substances") for optical fibers or optical waveguides. However, where a core diameter is designed to meet the waveguide condition for the single mode, the core diameter is generally limited to 15 to 16 micrometers or less of the doped region (ordinarily, a core portion) at which active lasing ions are doped, and therefore, it is generally difficult to guide the excitation light to the portion of that diameter with a high efficiency. To overcome this problem, for example, a double clad type fiber laser has been proposed.

FIG. 6 illustrates a double clad type fiber laser. As shown in FIG. 6, the double clad type fiber laser includes a clad portion 16, and a second clad portion 17 placed outside the clad portion 16 and formed of a transparent material having a lower refractive index than that of the clad portion 16. Excitation light 13 introduced from an end is confined in the clad portion 16 and a core portion 15 by total reflection created by a refractive index difference between the second clad portion 17 and the clad portion 16. The confined excitation light is controlled to repeatedly pass the doped region (ordinarily, the core portion 15) of the active lasing substances, thereby rendering the excitation light gradually absorbed by the active lasing substances. The double clad type fiber laser thus constructed can obtain a high power laser beam.

In the case of such a double clad type fiber laser, however, if the cross section of the inner clad portion is circle, there arises a problem that the mode may cause an absorption saturation in which excitation light selectively passing around the doped region (ordinarily, the core portion) of the active lasing substances is well absorbed by the active lasing substances whereas other regions show very low absorption efficiency. Although a rectangular inner clad portion has been devised, a fiber having a cross-sectional shape other than circle is hardly manufactured generally and may reduce a mechanical strength of the fiber.

Meanwhile, optical waveguide type lasers, due to manufacturing methods for the lasers, cannot make the waveguide length longer as much as that of an optical fiber, and it is difficult for optical waveguide type lasers to have a refractive index profile in a cross-sectional direction as complicated as the double clad type lasers have. To solve such problems with an optical waveguide laser, a method has been proposed in which excitation light is guide from a side face of the doped region (ordinarily, a core portion) of the active lasing substances for the optical waveguide, as disclosed in Japanese Laid-open Patent Publication No. Hei 4-51,027 and Japanese Laid-open Patent Publication No. Hei 3-3,283. When excitation light is guided from the side face to the doped region (ordinarily, a core portion) of the active lasing substances, excitation energy of an extremely large amount, in comparison with a method in which excitation light is slightly introduced in a cross-sectional direction of the waveguide, can be pumped in the waveguide because the waveguide length (L) is very long in comparison with a diameter (d) of the doped region of the active lasing substances, namely, L/d is $10^6$ or greater. Similarly, with an optical fiber laser, if excitation light could have been introduced from a side face, areas for introducing excitation light can be increased as much as wanted, and therefore, excitation light energy $10^6$ to 9 times larger than that of the method in which excitation light is introduced in the cross-sectional direction, or $10^3$ to $10^6$ times larger than that of the double clad type excitation method can be introduced in principle.

With the conventional side face excitation method thus described, however, when a single excitation light supplied from the side face is closely observed, this excitation light passes only one time the core serving as a doped region of the lasing active region. This core generally has a narrow width of about 50 to 60 micrometers. Therefore, it is very difficult to render the active lasing substances absorb the whole energy of the excitation light during one time passage over the narrow width. Accordingly, the conventional side face excitation method has a defect that much excitation light becomes useless.

This invention is devised on the basis of the background thus described, and it is an object of the invention to provide a laser apparatus capable of very effectively converting excitation light to laser oscillation light.

SUMMARY OF THE INVENTION

In one form of a laser apparatus according to the invention, the laser apparatus includes an optical guide containing active lasing substances and performs a laser oscillation by supplying excitation light to the active lasing substances. The optical guide has a length continuous and very long in comparison with each distance on a three-dimensional coordinate that shows the size of an area containing the optical guide and is arranged in a conglomerate form inside the area by being repeatedly folded or wound. The excitation light is radiated to the optical guide arranged in the conglomerate form to be introduced into the optical guide by way of an outer periphery of the optical guide for performing the laser oscillation.

The conglomerate form may be a disc shape, a cone shape, a regular polyhedron shape, a truncated polyhedron shape, an ellipse shape, a cocoon shape, an ellipsoid of revolution shape, a spiral shape, a sphere shape, a donut or ring shape, a torus shape, a fabric shape, or a shape linearly converted from one of those shapes, or a shape in combination of all or part of those shapes.

According to one embodiment of the invention, the optical guide is made of an optical fiber in the conglomerate form having at least an optical waveguide. The optical fiber in the conglomerate form is made immobile by covering all or a part of the optical fiber with a setting substance transmittable of the excitation light. The setting substance can be selected from a setting organic resin or glass, or a setting inorganic medium. The optical fiber in the conglomerate form may be made immobile mutually with an adjacent optical fiber by unitedly formed so that all or a part of the optical fiber is in contact with the adjacent optical fiber in a manner that each interface between a core and a clad of the optical fiber and the adjacent optical fiber is not impaired. The optical guide is either a double clad type optical fiber or an optical waveguide, formed with a clad and a second clad placed outside the clad.

In another aspect of the laser apparatus according to the invention, the optical guide is constituted of a core member constituting an optical fiber and arranged in the conglomerate form inside the area by being repeatedly folded or wound without contacting one another in the area. A lower refractive index substance is provided to cover a periphery of the core member constituting the optical guide, to fill a space between the core members adjacent to each other, and to form a clad member constituting the optical fiber together with the core member constituting the optical guide. A second clad member made of a substance having a lower refractive index than that of the clad member covers a periphery of the clad member. The laser oscillation is produced by introducing excitation light inside the core member by way of an outer periphery of the core member constituting the optical guide.

With the laser apparatus according to the invention, the laser oscillation is made when optically pumped by way of the outer periphery (side face) of the optical guide upon radiation of excitation light to the optical guide in the conglomerate form, where the optical guide is formed in the conglomerate form by repeatedly folding or winding the optical guide, which extends continuously with a very long length of the optical guide. When a single excitation light is observed, the excitation light repetitively passes the optical guide, thereby rendering the active lasing substances absorb much excitation light during the repetitive passage, so that the excitation becomes very effective.

An excitation method according to the invention is called, for the sake of convenience, to as "multiple side face excitation method"; a conventional method using a double clad type optical fiber or optical waveguide is called to as "double clad excitation method"; and a conventional method for introducing excitation light from an end face of a core is called to as "core end face excitation method." The following data indicate a comparison of compression ratios of photo flux densities at each conversion from excitation light to laser oscillation light among those methods.

Core end face excitation method: M=A core/A core=1

Double clad excitation method: M=A clad/A core=about $10^3$

Multiple side face excitation method:

$$M = A\ \text{side}/A\ \text{core} = dL/(\pi d^2/4) = L/d = \text{about } 10^9$$

Wherein M denotes flux density, and A denotes a cross-sectional area, where no internal loss as well as 100% conversion rate is assumed.

As apparent from the above comparison, there are large differences among the methods, and the method according to the invention has an outstanding compression ratio. Such a huge compression ratio of the flux density has a meaning that poor quality excitation light will be converted into high quality laser light. That is, it has a special implication that even low density excitation light such as sun light can generate a laser oscillation.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF PREFERRED EMBODIMENTS (First Embodiment)

Figure 1:
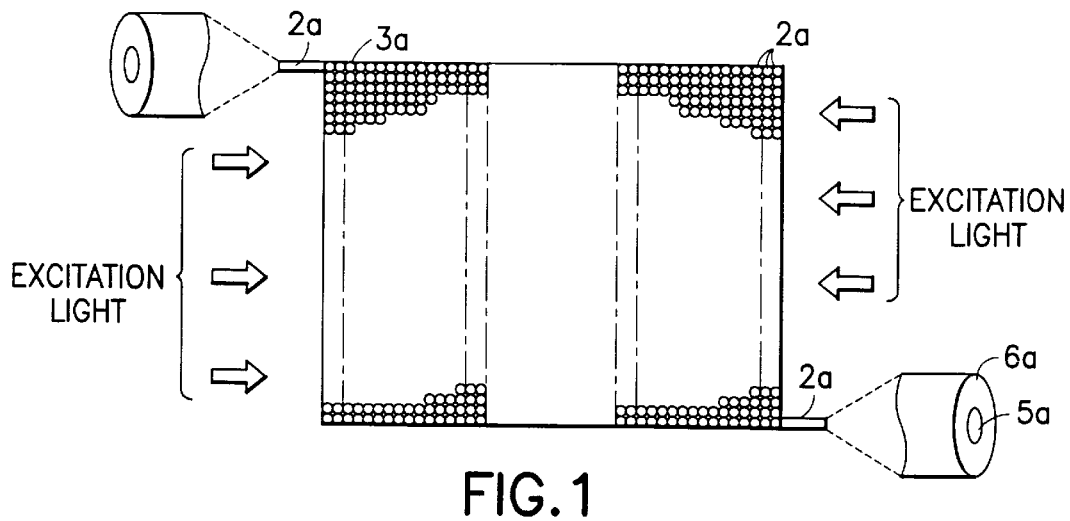
FIG. 1 is an illustration showing a structure of a laser apparatus as a first embodiment according to the invention.

FIG. 1 shows a laser apparatus according to a first embodiment of the invention. As shown in FIG. 1, in the laser apparatus of this embodiment, a continuous long laser fiber 2a is wound by multiple turns to be in a conglomerate form of a cylindrical shape having an inner radius of about 1 centimeter, an outer diameter of about 5 millimeters, and a height of 5 centimeters and made immobile with an ultraviolet setting resin. The laser apparatus has exposed opposed ends serving as outputs of the laser beam. The ultraviolet setting resin has a refractive index of 1.45 and transparency with respect to light whose wavelength is 0.8 micrometer, and fills space between the fibers adjacent to each other without a gap.

The laser fiber 2a has a core 5a whose diameter is 10 micrometers and a clad 6a whose diameter is 50 micrometers, has a numerical aperture of 0.1, and is made of a long quartz system glass fiber having a continuous length of about 3 kilometer. $Nd^{3+}$ ions of 0.5 atomic percent are doped in the core 5a. A grating having a reflection rate of 100 percent against light of 1.06 micrometer is formed on one end face of the laser fiber 2a, while a multilayer reflection coating having a reflection rate of 2.0 percent is formed on the other end face.

To fabricate this laser apparatus, a single long laser fiber 2a is wound around a metal bobbin having a bobbin radius of 1 centimeter and a height of 5 centimeters until that the outer diameter becomes 5 centimeters. The wound fiber is then dipped in the ultraviolet setting resin and receives radiation of ultraviolet light to make the resin setting, and the bobbin is removed to complete the laser apparatus.

Performance of this laser apparatus will be obtained as described below. This laser apparatus performs a laser oscillation of 30 watt output at a wavelength of 1.06 micrometer, where eight semiconductor laser arrays having an oscillation wavelength of 0.8 micrometer and a maximum output 10 watts are placed around the cylinder and when light is directed toward the cylinder to radiate the laser fiber 2a. The oscillated laser optical power and changes on the time basis are good as 30 watts±3 watts.

(Second Embodiment)

Figure 2:
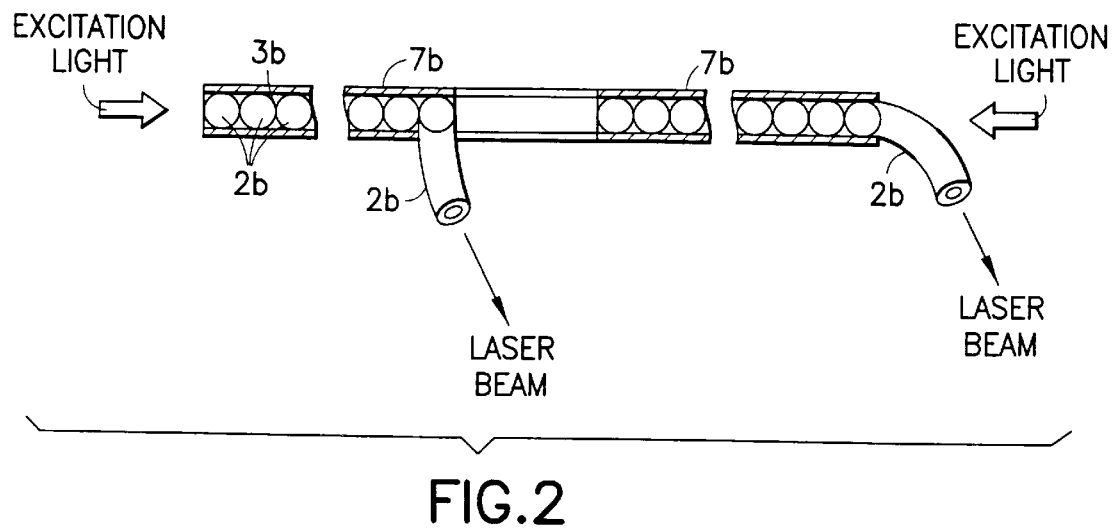
FIG. 2 is an illustration showing a structure of a laser apparatus as a second embodiment according to the invention.

FIG. 2 is an illustration showing a laser apparatus of a second embodiment according to the invention. As shown in FIG. 2, in the laser apparatus of this embodiment, a continuous long laser fiber 2b is wound into a single spiral layer by multiple turns and then made immobile with an ultraviolet setting resin to be in a disc shaped conglomerate form having an inner diameter of about 3 centimeters, an outer diameter of about 12 centimeters, and a thickness of 0.1 centimeter. The conglomerate form is polished to form mirror faces on major faces except a side face and vapor-deposited with metal reflection coating films 7b. It is expected to improve the efficiency by totally reflecting the excitation light at the mirror surface without employing the metal reflection coating films, should the high quality mirror surface be obtained. Though opposite ends of the laser fiber 2b are exposed to serve as output faces of the laser beam, the opposite ends are without reflection film or the like and remain as cut faces. The ultraviolet setting resin has a refractive index of 1.45 and transparency with respect to light whose wavelength is 0.8 micrometer, and fills space between the fibers adjacent to each other without a gap.

The laser fiber 2b has a core 5a whose diameter is 10 micrometers and a clad 6a whose diameter is 50 micrometers, has a numerical aperture of 0.1, and is made of a long quartz system glass fiber having a continuous length of about 170 meters. $Nd^{3+}$ ions of 0.5 atomic percent are doped in the core 5a.

The laser oscillation of this laser apparatus of 15 watt output at a wavelength of 1.06 micrometer is achieved where eight semiconductor laser arrays having an oscillation wavelength of 0.8 micrometer and a maximum output 10 watts are placed around the laser apparatus and when light from the laser arrays was radiated the laser fiber 2b from the side face as excitation light. The oscillated laser optical power and changes on the time basis are good as 15 watts±2 watts.

(Third Embodiment)

Figure 3:
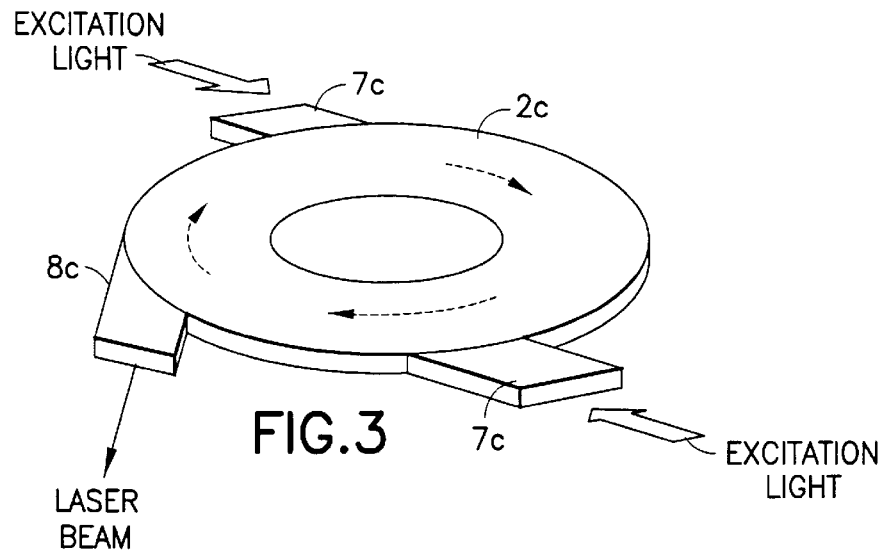
FIG. 3 is an illustration showing a structure of a laser apparatus as a third embodiment according to the invention.

FIG. 3 is an illustration showing a laser apparatus of a third embodiment according to the invention. The laser apparatus of this embodiment has a structure manufactured by the following processes.

First, a single continuous long laser fiber is tightly wound in a single spiral layer around a carbon bobbin having an outer diameter 3 centimeters as a center to be a conglomerate form of a flat ring shape having an inner diameter of 3 centimeters and an outer diameter of 15 centimeters. The laser fiber 2b has a core 5a whose diameter is 10 micrometers and a clad 6a whose diameter is 50 micrometers, has a numerical aperture of 0.1, and is made of a long quartz system glass fiber having a continuous length of about 280 meters.

Subsequently, two flat ring shaped quarts plates having an inner diameter of 3 centimeters, an outer diameter of 15 centimeters, and a thickness of 1 millimeter are prepared to sandwich the flat ring shaped conglomerate laser fiber from upper and lower sides of the fiber and are put in a metal pressure resistance container. The laser fiber sandwiched by the quarts plates are thermally treated at 1,500 degrees Celsius in an inert gas atmosphere, and pressed with a pressure of about 50 bar in a vertical direction, thereby filling gaps between the fibers and between the fiber and the quarts plate by fusion.

An optical accumulation ring body 2c is then obtained by optically 20 polishing both major surfaces, namely, front and back faces, of the flat ring body thus fabricated. Three quarts plates each having a thickness of 3 millimeters, a width of 3 centimeters, and a length of 7 centimeters are prepared. The side faces of the plates are optically polished and made into a shape having a contact face exactly matching the side face of the ring body when one end of the plate in the lengthwise direction of the plate is made in contact with the side face of the optical accumulation ring body 2c as to extend in a tangent direction of the side face of the optical accumulation ring body 2c. Those of the three quartz plates are made adhere, with a predetermined space between the quartz plates, to the side face of the ring body as to be in contact with the side face of the ring body. Two of the quarts plates serve as input portions 8c, 8c for excitation light, and the remaining plate is used for an output portion 9c of the laser beam. A metal reflection coating film is vapor-deposited on the entire surface except input ends of the input portions for excitation light and an output end of the output portion for laser beam.

The laser oscillation of 15 watt output at a wavelength of 1.06 micrometer from the output portion 9c for laser beam is achieved where four semiconductor laser arrays having an oscillation wavelength of 0.8 micrometer and a maximum output 10 watts are placed around each of the input ends of the two input portions 8c, 8c for excitation light and when light from the laser arrays is introduced by way of the two input portions 8c, 8c for excitation light to the light accumulation ring body. The oscillated laser optical power and changes on the time basis were good as 15 watts±2 watts.

(Fourth Embodiment)

A laser apparatus according to this embodiment is an example in which a single long laser fiber having a continuous length of about 2 kilometers is woven into a fabric form. That is, first, a warp portion is formed in a planate form by repetitively reciprocating a laser fiber, and then, a weft portion is formed by repetitively reciprocating the laser fiber as to pass the upper and lower sides of the warp alternatively, thereby making the laser fiber into a fabric form. In this embodiment, a laser apparatus in a fabric form of 30×30 centimeters was manufactured.

The laser fiber is made of a quartz system glass fiber having a core diameter of 5 micrometers, a clad diameter of 10 micrometers, and a numerical aperture of 0.2. $Nd^{3+}$ ions of 0.5 atomic percent are doped in the core. An ultraviolet setting resin having a refractive index of 1.45 and transparency with respect to light whose wavelength is 0.5 to 1.4 micrometer covers the periphery of the clad. The refractive index of the ultraviolet setting resin is 1.45, which coincides with that of the clad. One end between the opposite ends of the laser fiber is formed with a grating having 100 percent reflection rate with respect to light of a wavelength 1.06 micrometer emitted from the inside of the core, whereas the other end remains as a cut end face.

When this fabric received a focused sun light during a fine weather using a mirror having a magnification of 100, a laser oscillation of 0.5 watt output in average at a wavelength of 1.06 micrometer is achieved.

(Fifth Embodiment)

Figure 4:
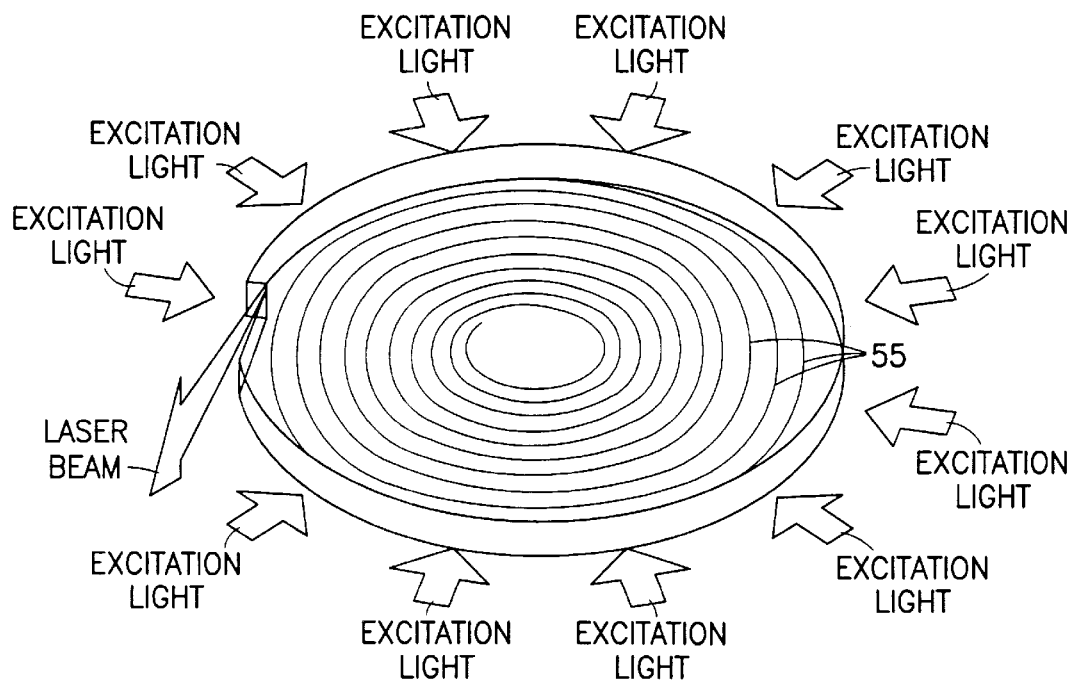
FIG. 4 is a perspective view showing the entire structure of a laser apparatus as a fifth embodiment according to the invention.
Figure 5:
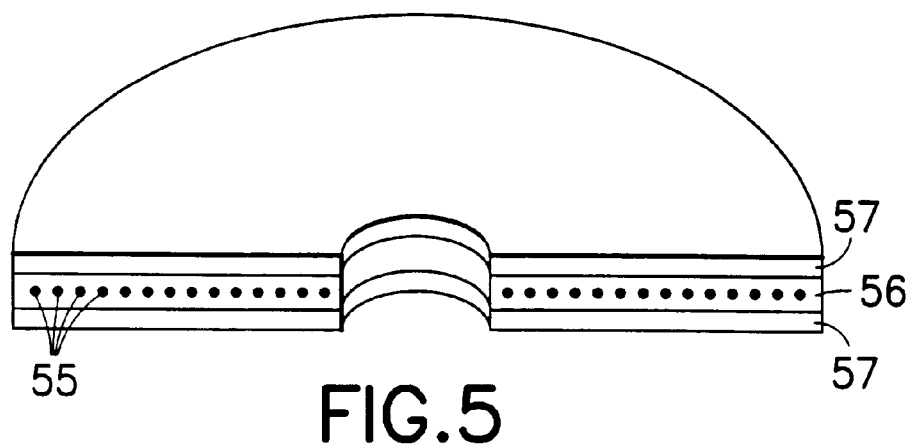
FIG. 5 is an illustration showing the laser apparatus in FIG. 4 with partially cut at the center of the apparatus.
Figure 6:
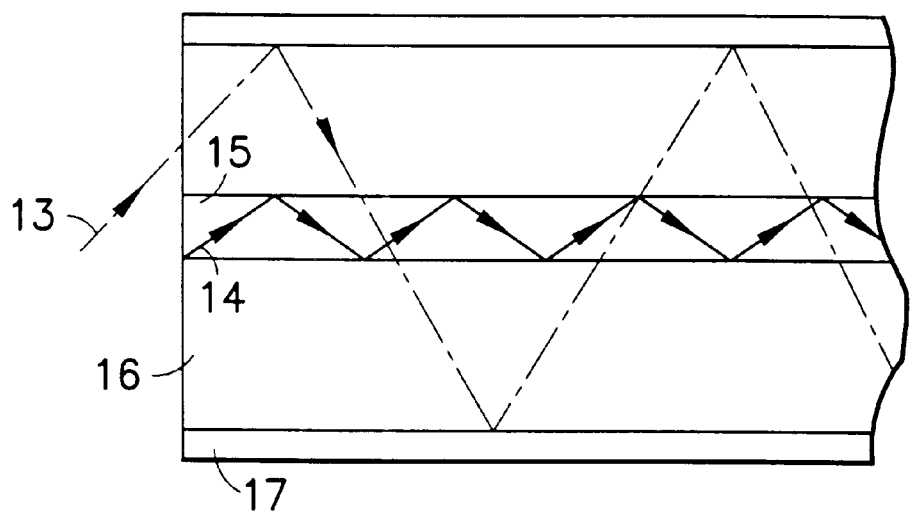
FIG. 6 is an illustration showing a conventional double clad type optical fiber laser apparatus.

FIG. 4 is a perspective view showing the whole constitution of a laser apparatus according to a fifth embodiment of the invention; FIG. 5 is an illustration showing a cut model of the laser apparatus shown in FIG. 4 cut at a center of the apparatus.

As shown in FIGS. 4, 5, this embodiment is an example in which an optical guide is formed of a core member constituting a part of an optical fiber. That is, in the above embodiments, the optical guide is made of an optical fiber in which a core and a clad are in a united body, but in this embodiment, a core member as a part of an optical fiber constitutes an optical guide.

In FIGS. 4, 5, a core member 55 constituting an optical guide is made in a conglomerate form by spirally winding a phosphate system laser glass fiber (doped with $Nd^{3+}$ ions of 1.0 atomic percent) having a core diameter of 100 micrometers and a length of 100 meters in parallel with a predetermined plane as to avoid any contact between fibers adjacent to each other.

In the core member 55 formed in the conglomerate form, the periphery of the member is covered with a clad member 56 made of an ultraviolet setting resin having a refractive index of 1.51, and the core member is made so immobile in a disc form as to fill gaps between the core members adjacent to each other. Front and back faces, except an outer peripheral face, of the disc shaped clad member 56 are covered with a second clad member 57 made of an ultraviolet setting resin having a refractive index of 1.49. An inner end face of the spiral of the spirally wound core member 55 is formed with a multilayer coating film having a reflection rate of 99 percent or greater with respect to a laser oscillation wavelength of 1.06 micrometer after plane-polished to reflect the laser beam, and an outer end face of the spiral serves as an output portion for oscillated laser beam.

With the laser apparatus of the embodiment, as shown in FIG. 4, excitation light is introduced from the outer peripheral face of the disc shaped clad member 56 into the clad member 56. The introduced excitation light is reflected by the second clad member 57 and absorbed by the core member 55 to perform the laser oscillation while proceeding in a zigzag manner in the clad member 56.

A good laser oscillation of 120 watt output at a wavelength of 1.06 micrometer from the output portion is obtained where sixteen semiconductor laser arrays having an oscillation wavelength of 0.8 micrometer and an output of 20 watts are used and located around the laser apparatus to introduce excitation light in the clad member 56. Although this output amount is 120 watts because a small number of the semiconductor laser arrays is used for excitation, this is not a limit of this laser apparatus, and upon using a large number of semiconductor laser arrays, it would be expected to obtain an output of 2 kilowatts or greater. When the output of this laser apparatus was converged with a lens system having a focal distance of 50 millimeters, energy of 90 percent or more of the output could be converged within a diameter of 120 micrometers.

Although in the above embodiments, examples in which an optical fiber is used as a laser medium are described, an optical waveguide can be used as a laser medium. To use such an optical waveguide, a single continuos long core is so formed as to be folded or wound within a prescribed area of a clad medium. This core's formation is made as a pattern of so-called one stroke of pen in using a known pattern forming method or ion exchange method. Although in the above embodiments, examples in which a single continuous long optical fiber or optical waveguide is arranged as an optical guide in a conglomerate form within a prescribed area are described, plural continuous long optical fibers or waveguides can be arranged in a prescribed area. In addition, although in the above embodiments, an optical fiber or optical waveguide is exemplified as an optical guide, the optical guide can be any optical path, other than the optical fiber or optical waveguide, capable of propagating light in confining light to some extent in the path.

As described above, the laser apparatus according to the invention includes an optical guide containing active lasing substances and performs a laser oscillation by supplying excitation light to the active lasing substances. The optical guide has a length continuous and very long in comparison with each distance on a three-dimensional coordinate that shows the size of an area containing the optical guide and is arranged in a conglomerate form inside the area by being repeatedly folded or wound. According to the laser apparatus, the excitation light is radiated to the optical guide arranged in the conglomerate form to be introduced into the optical guide by way of an outer periphery of the optical guide for performing the laser oscillation,, thereby extremely effectuating conversion from the excitation light to a laser oscillation light. The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but the be defined claims set forth below.

What is claimed is:

1. A laser apparatus having an optical guide containing active lasing substances, said laser apparatus performing a laser oscillation by supplying excitation light to the active lasing substances, wherein the optical guide has a length continuous and very long in comparison with each distance on a three-dimensional coordinate that shows the size of an area containing the optical guide and is arranged in a conglomerate form inside the area by being repeatedly folded or multiply wound, and wherein the excitation light is introduced into the optical guide arranged in the conglomerate form by way of an outer periphery thereof so that the excitation light repeatedly passes through the optical guide and is absorbed into the active lasing substances to result in performing the laser oscillation.

2. The laser apparatus according to claim 1, wherein the conglomerate form is a disc shape, a cone shape, a regular polyhedron shape, a truncated polyhedron shape, an ellipse shape, a cocoon shape, an ellipsoid of revolution shape, a spiral shape, a sphere shape, a donut or ring shape, a torus shape, a fabric shape, or a shape linearly converted from one of those shapes, or a shape in combination of all or part of those shapes.

3. The laser apparatus according to claim 1, wherein the optical fiber in the conglomerate form is made immobile mutually with an adjacent optical fiber by unitedly formed so that all or a part of the optical fiber is in contact with the adjacent optical fiber in a manner that each interface between a core and a clad of the optical fiber and the adjacent optical fiber is not impaired.

4. The laser apparatus according to claim 3, wherein a gap between each fiber is diminished by melting.

5. The laser apparatus according to claim 3, wherein the laser apparatus further comprises a reflecting portion for reflecting the excitation light in order to store the excitation light in the unitedly formed portion of the optical fiber.

6. The laser apparatus according to claim 5, wherein the reflecting portion is constituted of a reflecting coating surface or a mirror polished surface.

7. The laser apparatus according to claim 1, wherein the optical guide is constituted of a core member constituting an optical fiber and arranged in the conglomerate form inside the area by being repeatedly folded or wound without contacting one another in the area, wherein a lower refractive index substance is provided to cover a periphery of the core member constituting the optical guide, to fill a space between the core members adjacent to each other, and to form a clad members constituting the optical fiber together with the core members constituting the optical guide, wherein a second clad member made of a substance having a lower refractive index than that of the clad member covers a periphery of the clad member, and wherein the laser oscillation is produced by introducing excitation light inside the core member by way of an outer periphery of the core member constituting the optical guide.

8. The laser apparatus according to claim 1, wherein the optical guide is made in the conglomerate form of an optical fiber having at least an optical wave guide therein; the optical fiber being covered partially or entirely with a setting substance through which the excitation light is transmissible and being embedded in the setting substance; whereby the laser oscillation is performed by the excitation light being introduced into an interior of the optical fiber by way of the outer periphery thereof when the excitation light is introduced into the substance.

9. The laser apparatus according to claim 1, wherein the optical guide is made in the conglomerate form of an optical fiber having at least an optical wave guide therein, the optical fiber is fixed by covered partially or entirely with a hardening substance through which the excitation light is transmissible, the excitation light is introduced into the hardening substance, the excitation light is introduced into the interior of the optical fiber by way of the outer periphery thereof to generate the laser oscillation, and each optical fiber is embedded in the hardening substance.

10. The laser apparatus according to claim 9, wherein the optical guide is made of an optical fiber in the conglomerate form having at least an optical waveguide to generate the laser oscillation, and the laser apparatus further comprises a reflecting portion for reflecting the excitation light in order to store the excitation light in the hardening substance.

11. The laser apparatus according to claim 10, wherein the reflecting portion is constituted of a reflecting coating surface, a mirror polished surface, or a clad member having index of refraction lower than that of the hardening substance.

12. The laser apparatus according to claim 9, wherein the hardening substance is a hardening organic resin or glass, or a hardening inorganic medium.

* * * * *